United States Patent Office 3,227,658
Patented Jan. 4, 1966

3,227,658
ACTIVATION OF GROUP VIII METAL-CONTAINING CATALYSTS
John W. Myers and William N. Axe, Bartlesville, Okla., assignors to Phillips Petroleum Company, a corporation of Delaware
No Drawing. Filed Mar. 9, 1962, Ser. No. 178,587
14 Claims. (Cl. 252—433)

This invention relates to a process for activating catalysts consisting essentially of a hydrogenating component consisting of a Group VIII metal-containing catalyst and an alumina-containing support. Another aspect of the invention is concerned with the conversion of hydrocarbons utlizing the activated catalyst.

Catalysts consisting essentially of Group VIII metal-containing components deposited on active alumina-containing supports have frequently been used in the isomerization, hydrocracking, alkylation, and polymerization of hydrocarbon feeds. These components are incorporated on the support by impregnation, precipitation and other methods well known in the art. The Group VIII metals include Pt, Pd, Ru, Rh, Os, and Ir, as the noble metals, and Fe, Ni, and Co. The preferred metals include the noble metals, cobalt and nickel. Nickel and cobalt may be used as the molybdates as well as in metallic form.

The supports for the hydrogenating components include the porous active oxides containing alumina, including alumina itself, halogenated alumina, alumina-silica, silica-magnesia-alumina, etc. These supports and methods of preparing them are well known in the prior art.

The principal object of the invention is to provide a process for activating the foregoing catalysts. A further object is to provide more active catalysts so as to produce increased yields of hydrocarbons when converting hydrocarbons to other more desirable hydrocarbons in contact therewith. Another object is to provide an improved isomerization process utilizing catalyst of enhanced activity. It is also an object of the invention to provide an improved hydrocarbon conversion process utilizing the more active catalysts of the invention. Other objects will become apparent upon consideration of the accompanying disclosure.

The foregoing catalysts have been found to be substantially increased in activity by contact at elevated temperatures with an activating agent selected of the group consisting of the volatile chlorides and bromides of boron and phosphorus and the mixed chlorobromides thereof. These activating agents include $BCl_3$, $BBr_3$, $POCl_3$, $POBr_3$, $PCl_3$, $PCl_5$, $PBr_3$, and the mixed chlorobromides. The activating treatment comprises contacting the catalyst with the gaseous activating agent at temperatures in the range of 700 to 1500° F. and, preferably, 1000 to 1300° F., for a period of at least 0.1 hour and up to 10 hours or more. A preferred treating period is in the range of 0.2 to 4 hours. A gaseous diluent or carrier, such as nitrogen, hydrogen, or the light hydrocarbons which are unreactive in the presence of these catalysts may be employed with the activating agent. However, the vaporized activating agent may be used in 100 percent concentration or in a concentration in the carrier gas as low as 0.5 volume percent, concentrations above 1 to 2 percent being preferred. Pressures above atmospheric are not necessary for the treating step to be effective, but somewhat elevated pressure is ordinarily employed in order to facilitate flow of the activating agent thru the apparatus.

Following the treatment with the gaseous boron or phosphorus halide of mixtures thereof, some additional increased activity can be obtained by subliming a small amount (0.2 to 5 weight percent) of $AlCl_3$ or $AlBr_3$ onto the catalyst. The catalysts of enhanced activity can be utilized in the several reactions previously named, isomerization of paraffins being a well known application for this type of catalyst. Isomerization is usually carried out with the present catalysts at temperatures in the range of 250 F. to 500 F., pressures from 50 to 1000 p.s.i.g., flow rates (LHSV) of 0.2 to 10, and $H_2$/hydrocarbon mol ratios of 0.5/1 to 10/1.

*Example*

A commercial platinum reforming catalyst containing 0.4 weight percent platinum, 0.3 percent chlorine, 0.5 percent fluorine with the remainder active alumina, was used in each of the runs below.

Run No. 1 was carried out as a basis of comparison using the reforming catalyst without boron or phosphorus halide-treating.

The catalyst of Run No. 2 was dried in a stream of nitrogen at 1200 F. and one atomsphere pressure for 1¼ hours. The catalyst was cooled and boron trichloride was then added to the nitrogen stream, the catalyst being contacted with this stream for 2 hours with the temperature being raised from 150 F. to 450 F. in the first three-fourths hour and held at 450 F. for the remainder of the period.

The catalyst of Run No. 3 was dried in nitrogen at 1200 F. for 1.6 hours and then treated with a $BCl_3$—$N_2$ mixture at 1200 F. for 40 minutes.

The catalyst of Run No. 4 was dried in nitrogen at 1200 F. for 1¼ hours. The nitrogen stream was then passed through a $POCl_3$ bubbler and the stream was passed over the catalyst at 1200 F. for 4.8 hours.

Each of these catalysts was tested for isomerization using butane containing 0.03 weight percent $CCl_4$ as the feed. Test conditions and results are given in the table below.

| Run number | 1 | 2 | 3 | 4 |
|---|---|---|---|---|
| Treatment | Untreated | $BCl_3$ at 150–450 F. | $BCl_3$ at 1,200 F. | $POCl_3$ at 1,200 F. |
| Test Conditions: | | | | |
| Temperature, F | 301 | 298 | 302 | 295 |
| Pressure, p.s.i.g | 500 | 500 | 500 | 500 |
| LHSV | 1.1 | 1.2 | 1.3 | 1.2 |
| $H_2$; HC, mol ratio | 0.7 | 0.4 | 0.3 | 0.3 |
| Isobutane in product, percent | 0 | 0 | 9.4 | 14.7 |

These conversions with the catalysts treated at 1200 F. are very significant, since 300 F. is a low temperature for isomerizing butane.

Certain modifications of the invention will become apparent to those skilled in the art and the illustrative details disclosed are not to be construed as imposing unnecessary limitations on the invention.

We claim:
1. A process for increasing the activity of a catalyst consisting essentially of a Group VIII metal-containing hydrogenating component deposited on a porous active alumina-containing support which comprises heating said catalyst in dry condition in a dry gaseous ambient including a substantial and activating concentration of at least one volatile activating agent of the group consisting of $BCl_3$, $BBr_3$, $POCl_3$, $POBr_3$, $PCl_3$, $PCl_5$, $PBr_3$ and mixed chlorobromides thereof at a temperature in the range of 700 to 1500° F. for a period in the range of 0.1 to 10 hours.

2. The process of claim 1 wherein said activating agent is admixed with a carrier gas.

3. The process of claim 2 wherein said carrier gas is $H_2$.

4. The process of claim 2 wherein said carrier gas is $N_2$.

5. The process of claim 1 wherein said hydrogenating component is Pt.

6. The process of claim 1 wherein said hydrogenating component is Pt and said support is active alumina.

7. The process of claim 1 wherein said activating agent comprises $POCl_3$.

8. The process of claim 1 wherein said activating agent comprises $BCl_3$.

9. A process for increasing the activity of a catalyst consisting essentially of a Group VIII metal-containing hydrogenating component deposited on a porous activated alumina-containing support which comprises drying said catalyst at a temperature in the range of 1000 to 1300° F. in a dry inert gas for at least 0.2 hour so as to produce a dry catalyst; thereafter, while said catalyst is in dry condition, heating same for a period of at least 0.2 hour at a temperature in the range of 1000 to 1300° F. in a dry gaseous ambient including a substantial and activating concentration of at least one volatile activating agent of the group consisting of $BCl_3$, $BBr_3$, $POCl_3$, $POBr_3$, $PCl_3$, $PCl_5$, $PBr_3$ and mixed chlorobromides thereof.

10. The process of claim 9 wherein said hydrogenating component is Pt.

11. The process of claim 10 wherein said support is active alumina, said gas is $N_2$, and said activating agent comprises $POCl_3$ in admixture with $N_2$.

12. The process of claim 10 wherein said support is active alumina, said gas is $N_2$, and said activating agent comprises $BCl_3$ in admixture with $N_2$.

13. The process of claim 9 wherein said hydrogenating component is Ni.

14. The process of claim 9 wherein said hydrogenating component is Co.

References Cited by the Examiner
UNITED STATES PATENTS

| | | | |
|---|---|---|---|
| 2,890,167 | 6/1959 | Haensel | 208—139 |
| 2,935,545 | 5/1960 | Bloch et al. | 260—683.66 |
| 3,121,696 | 2/1964 | Hoekstra | 252—442 X |

MAURICE A. BRINDISI, *Primary Examiner.*

DANIEL E. WYMAN, ALPHONSO D. SULLIVAN,
*Examiners.*